Sept. 17, 1929. F. W. KRANZ 1,728,617
METHOD AND APPARATUS FOR ELIMINATION OF STATIC DISTURBANCES
Filed June 9, 1924
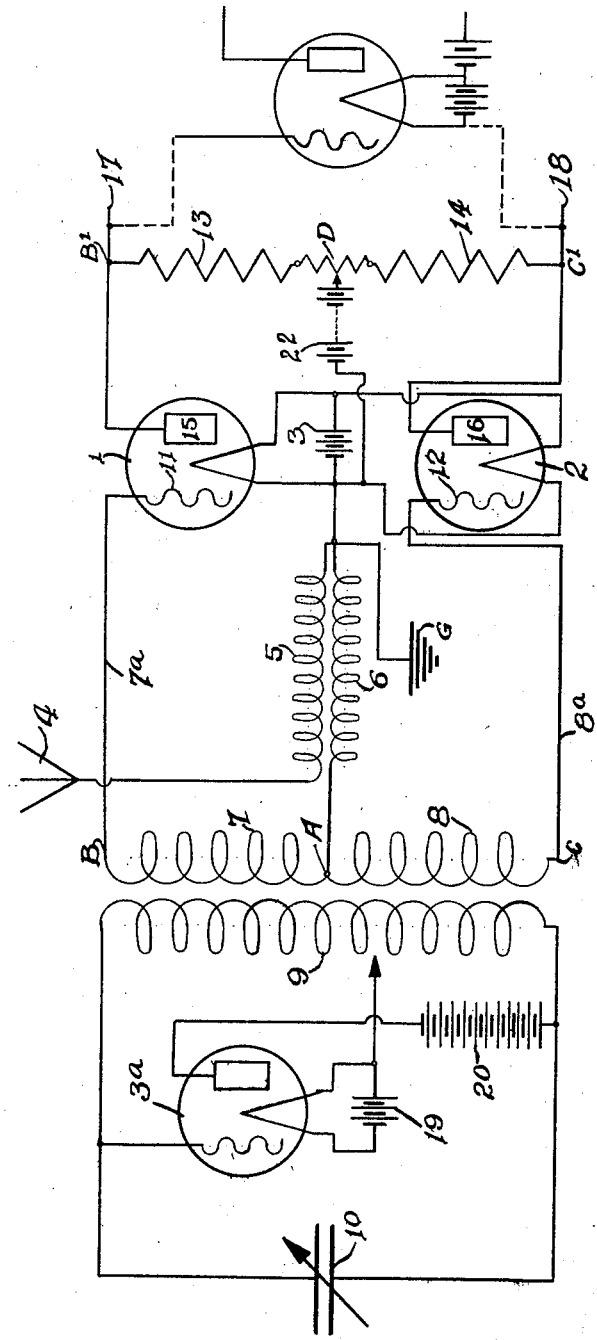
Inventor
Frederick W. Kranz
by Charles K. Sill
Attys.

Patented Sept. 17, 1929

1,728,617

UNITED STATES PATENT OFFICE

FREDERICK W. KRANZ, OF GENEVA, ILLINOIS, ASSIGNOR TO B. CUMMING, TRUSTEE

METHOD AND APPARATUS FOR ELIMINATION OF STATIC DISTURBANCES

Application filed June 9, 1924. Serial No. 718,768.

In the reception of radio messages, one of the chief sources of difficulty in securing proper reception is the presence of electrical disturbances known as static, which cannot be eliminated by the simple tuning of the usual receiving set.

It is an object of this invention to provide a method and apparatus whereby these disturbances may be eliminated or greatly minimized in the reception of radio messages.

It is a further object of this invention to provide means for associating together two audion vacuum tubes such as are usual in radio receiving sets, and using them as detector tubes in such a fashion that a voltage impressed upon them by an impulse from the antenna will have an equal effect upon both of them, the output of such tubes being so associated together and so connected in opposing senses with the circuits of the subsequent apparatus that there will appear in said subsequent circuits no effect of the impulses from the antenna itself.

It is a further object of this invention to provide means for connecting electrically with two detector tubes the electrical oscillations from a local source in such a fashion that the resulting voltages will be impressed upon the grids of the two detector tubes equally, but in opposite phase. The resulting voltages of the same frequency as these locally generated oscillations, as well as those of the interaction frequencies between the locally generated voltages and those received from the antenna, which appear in the output, will be equal from the two tubes, and due to the arrangement of the outputs in connection with the subsequent apparatus these voltages will be impressed upon said apparatus.

It is also an object of this invention to provide means for eliminating in a radio receiving apparatus the direct effects of electrical impulses from the antenna, but preserving the interaction effects which these electrical impulses from the antenna have with locally controlled electrical impulses.

It is finally an important object of this invention to provide a method and apparatus of the class described, which is adapted to permit of proper signal reception and at the same time to eliminate undesirable electrical disturbances.

The invention (in a preferred form) is shown on the drawings and hereinafter more fully described.

On the drawings:

The figure is a diagrammatic illustration of an electric circuit, embodying the principles of this invention.

As shown on the drawings:

A circuit contains two vacuum tubes 1 and 2, with a common filament battery 3, one end of which is connected with ground at G, and also through an inductance coil 5 to an antenna 4. A coil 6 connected with said battery 3 is inductively coupled to the coil 5. One terminal of the coil 6 is connected to coils 7 and 8 at a common point A, and the opposite ends of said coils are connected by conductors 7ª and 8ª respectively to grids 11 and 12 of the tubes 1 and 2 respectively. The coils 7 and 8 are of the same dimensions, and are so wound that the direction of winding is the same in passing from a point B to point A, as in passing from point A to point C.

Said coils 7 and 8 are also inductively coupled to a coil 9, which is the oscillation coil of a circuit which also contains a vacuum tube 3ª, batteries 19 and 20, and a tuning condenser 10.

The circuit including the two detector tubes 1 and 2 is completed by two equal coils or resistances 13 and 14 which are connected to the plates of said tubes, and at a common point D to a "B" battery 22.

The connection from the detector unit of this invention to the usual type detecting and amplifying apparatus and telephone receivers connected thereto, is made from the points B' and C' by conductors 17 and 18. The two detector tubes are thus in perfect symmetry with all other parts of the apparatus, with the exception of the direction of the inductive coupling between coil 9 and the coils 7 and 8.

It is a well known characteristic of vacuum tube circuits, especially when adjusted so that the tube functions particularly as a detector, that when two or more frequencies are impressed on the input, there will appear in the output not only the impressed frequencies, but also the octaves of these frequencies, as well as the sums and differences of the impressed frequencies.

Because of the symmetrical arrangement of the circuits of this invention, the electrical impulses impressed on the tubes by the antenna by means of the coils 5 and 6, will affect the two tubes equally so that these impulses will always cause equal potentials on the grids 11 and 12, and likewise the points B' and C' will have no difference of potential due to impulses or frequencies from the antenna. Therefore, the impulses or frequencies from the antenna will of themselves not cause a voltage to be impressed on the output terminals 17 and 18 if the circuits and tubes are properly balanced and their direct effects will consequently be eliminated. Because of the relative direction of winding of the coils 7, 8 and 9, an alternating current through the coil 9 will cause potential differences in the coils 7 and 8, such that, if point B is at a higher potential than the point A, then said point A is at a higher potential than the point C, and by an equal amount. Thus, when the grid 11 has a positive potential with respect to ground, the grid 12 will have a negative potential, and in the output of the tubes a potential, due to the impressed potential from coil 9, will appear across the conductors 17 and 18. Also, the potentials of the sum and of the difference frequencies due to the interaction between frequencies from the antenna 4 by way of the coils 5 and 6, and those from the local oscillator by way of the coils 9, 7 and 8, will appear across the conductors 17 and 18.

It will thus appear that the direct effects of the voltages from the antenna are eliminated, while the signal effects or currents which it is desired to receive are preserved by interaction with the frequency of the local oscillator. If the frequency of said local oscillator is properly related to that of the desired incoming signal frequencies, the interaction frequencies, usually the difference frequencies, will be those of the broadcasted signals or other signals which it is desired to receive. Only such static disturbances will be transmitted as have a frequency which will interact with that of the local oscillator to give a frequency which will be transmitted by the apparatus attached to conductors 17 and 18, and it will be apparent that the apparatus may be so adjusted that these are negligible The impedances 13 and 14 may be resistances with conductors 17 and 18 directly connected on, or they may be inductive impedances with 17 and 18 inductively coupled by a coil. The connection point D may be made variable, as an assistance in properly balancing the tubes and circuits.

The frequencies of the voltage produced by the interaction between the incoming signal and the local oscillator may be above the audible range, and the subsequent apparatus may then consist of amplifiers and another detector unit to produce the original audible sound desired.

I am aware that numerous details of construction and arrangement of circuits may be varied through a wide range without departing from the principles of this invention, and I therefore do not purpose limiting the patent granted hereon otherwise than necessitated by the prior art.

I claim as my invention:

1. In a circuit of the class described, two similar vacuum tube detectors symmetrically arranged, a radio receiving circuit, a circuit including the grids of both of said tubes and said radio receiving circuit, a tuned oscillator electrically or magnetically connected to said grid circuit, the connection being made in opposite senses to the two grids, said oscillator being tuned to such a frequency that frequencies intermediate between the received radio frequencies and audible frequencies will be produced by the interaction in the detector circuits between the said frequency of the oscillator and the said radio frequencies, an output circuit including the plates of both of said tubes and a pair of substantially electrically similar impedances connected to said plates and at a common point to the said vacuum tubes through a plate battery, means for varying the relative amounts of impedance connected to said plates, and suitable receiving means connected to said impedances.

2. In a radio telephone receiving apparatus in combination, a local oscillator circuit set to a frequency appreciably removed from the carrier frequency, an antenna, a balanced detector circuit connected to said antenna and inductively coupled to said local oscillator circuit whereby the output from the detector circuit will contain the frequency of an interval between the carrier frequency and the local oscillator frequency with speech impressed side bands on either side, and an amplifying and detector circuit connected to the output of said balanced detector circuit.

3. In a radio telephone receiving apparatus in combination, a local oscillator circuit set to a frequency removed at least thirty kilo-cycles from the carrier frequency, a source of speech impressed energy, a balanced detector circuit connected to said source and coupled to said local oscillator circuit whereby the output from the detector circuit will contain the frequency of the interval between the carrier frequency and the local oscillator with speech impressed side bands on either side, and a second detector circuit connected to the output of said balanced detector circuit.

In testimony whereof I have hereunto subscribed my name.

FREDERICK W. KRANZ.